United States Patent [19]

Bohmer et al.

[11] Patent Number: 4,641,923

[45] Date of Patent: Feb. 10, 1987

[54] FIELD SENSITIVE OPTICAL DISPLAYS WITH ELECTRODES WITH HIGH AND LOW IMPEDANCE PORTIONS

[75] Inventors: William Bohmer, Jackson Heights, N.Y.; Walter J. Betancourt, Oak Ridge; Louis S. Hoffman, Morristown, both of N.J.

[73] Assignee: Control Interface Company Limited, Randolph, N.J.

[21] Appl. No.: 624,119

[22] Filed: Jun. 25, 1984

Related U.S. Application Data

[60] Division of Ser. No. 479,349, Apr. 1, 1983, Pat. No. 4,493,531, which is a continuation of Ser. No. 165,753, Jul. 3, 1980, abandoned.

[51] Int. Cl.$^4$ .................. G02F 1/133; G02F 1/137
[52] U.S. Cl. ................................. 350/335; 350/336
[58] Field of Search ................ 350/336, 335, 392, 393

[56] References Cited

U.S. PATENT DOCUMENTS

| | | | |
|---|---|---|---|
| 2,024,737 | 8/1933 | Klingsporn | 350/392 X |
| 3,555,454 | 7/1968 | Myers et al. | 350/393 X |
| 3,609,002 | 9/1971 | Fraser | 350/392 X |
| 3,781,465 | 12/1973 | Ernstoff et al. | 350/335 |
| 3,834,794 | 9/1974 | Soref | 350/336 X |
| 3,975,085 | 8/1976 | Yamada et al. | 350/336 |
| 4,054,368 | 10/1977 | Krueger et al. | 350/336 X |
| 4,097,128 | 6/1978 | Matsumoto et al. | 350/336 |

Primary Examiner—John K. Corbin
Assistant Examiner—David Lewis
Attorney, Agent, or Firm—Kenyon & Kenyon

[57] ABSTRACT

Disclosed are field sensitive optical displays, and arrangements and methods for inducing fields in the displays and for scanning the displays. In the disclosed embodiments, liquid crystal, optoceramic and electroluminscent materials are utilized. Methods and arrangements for improving the response time of twisted nematic liquid crystal material and for generating color displays are also disclosed. Methods and arrangements are also disclosed for superimposing varying and a dc fields in field sensitive material. Various display patterns such as a movable dot, intersecting lines and a pivoting line can be obtained.

7 Claims, 21 Drawing Figures

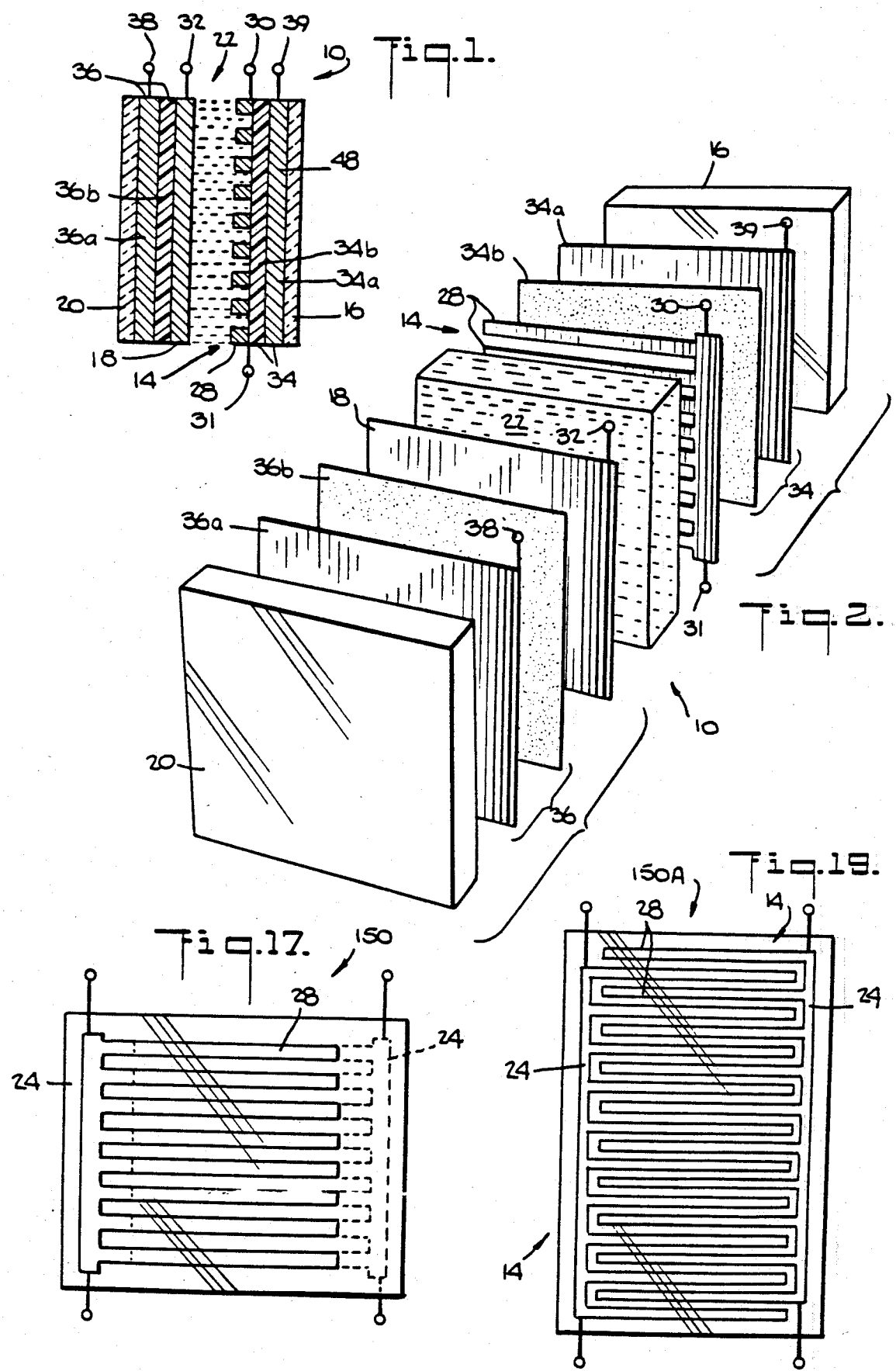

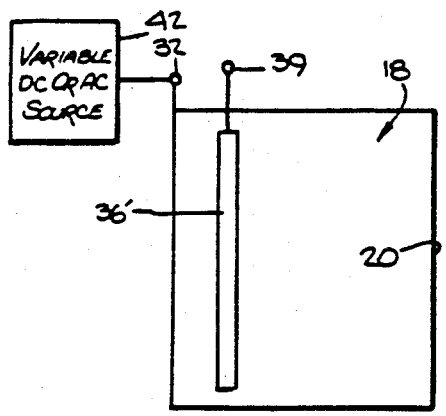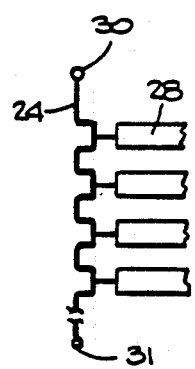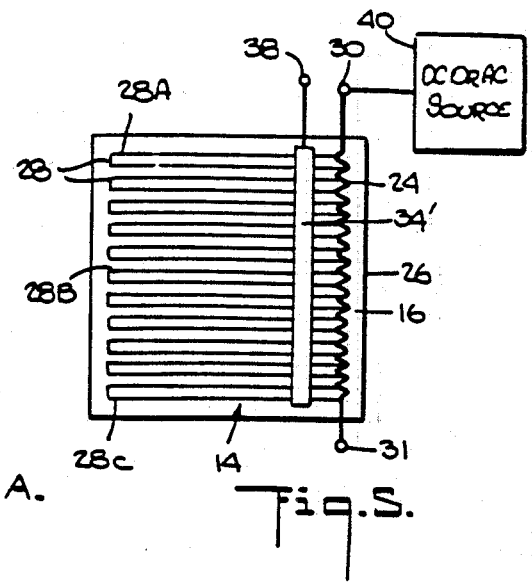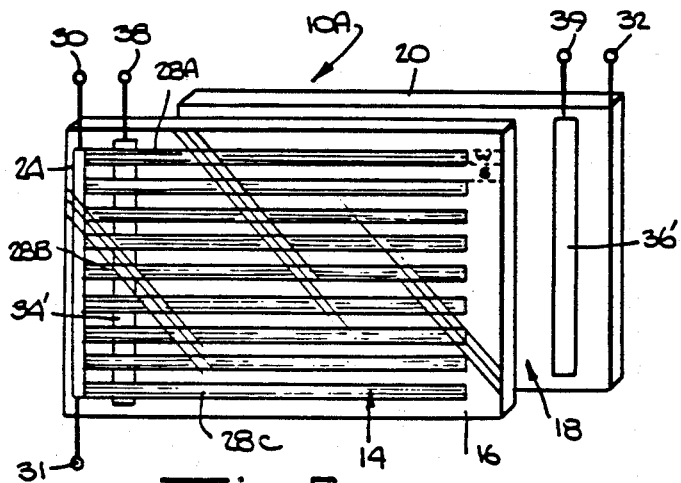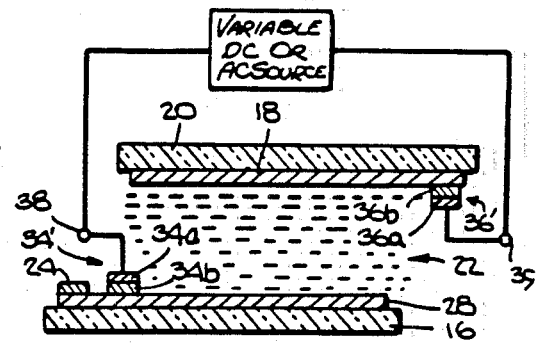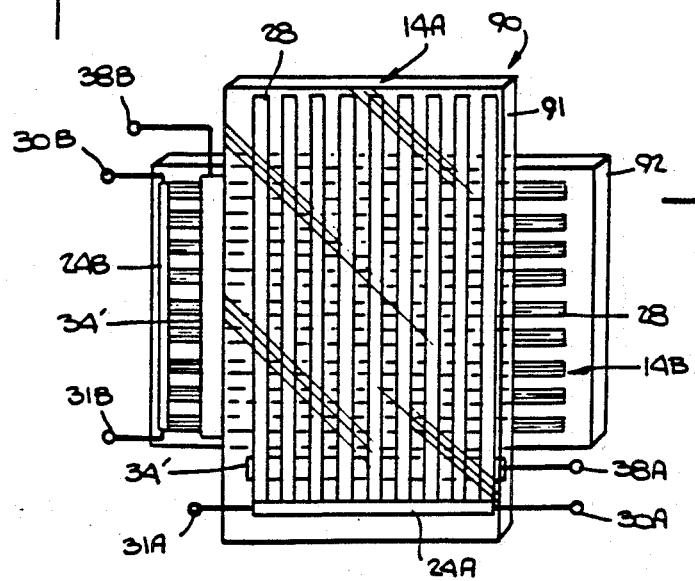

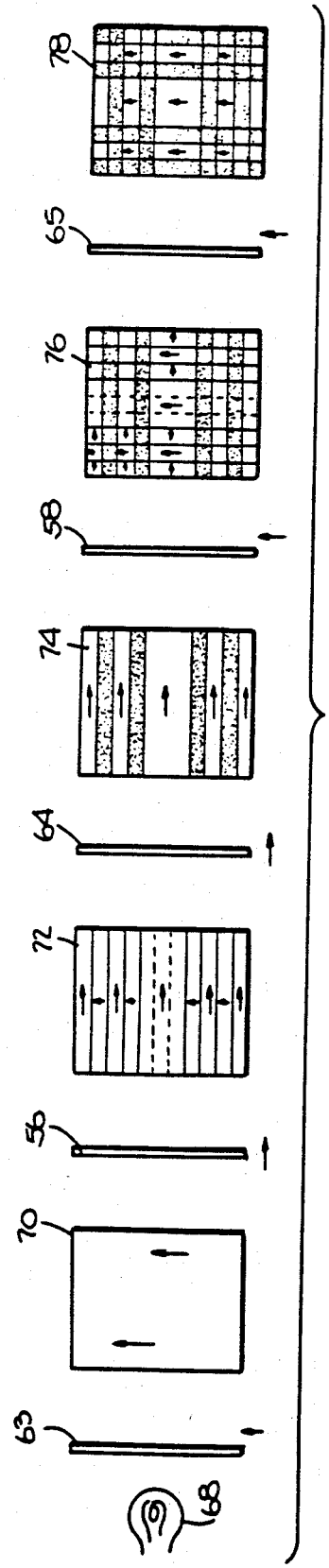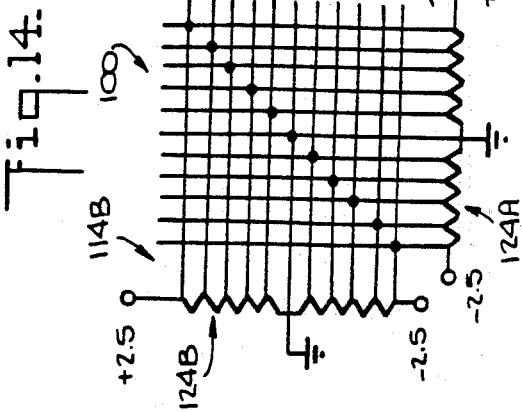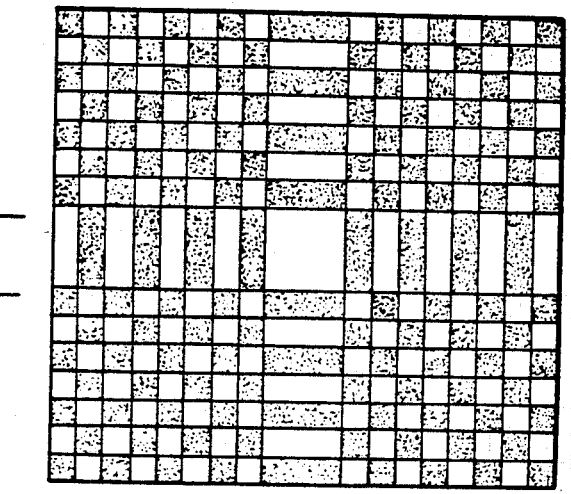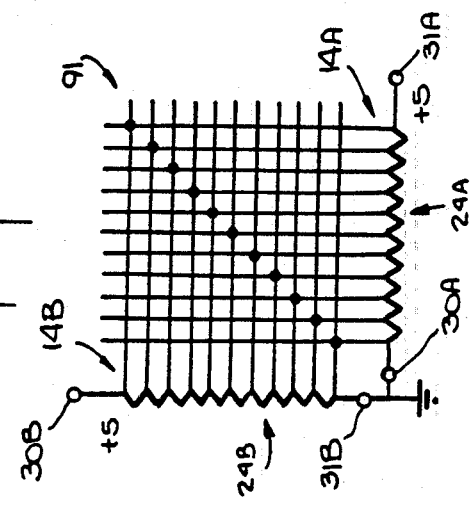

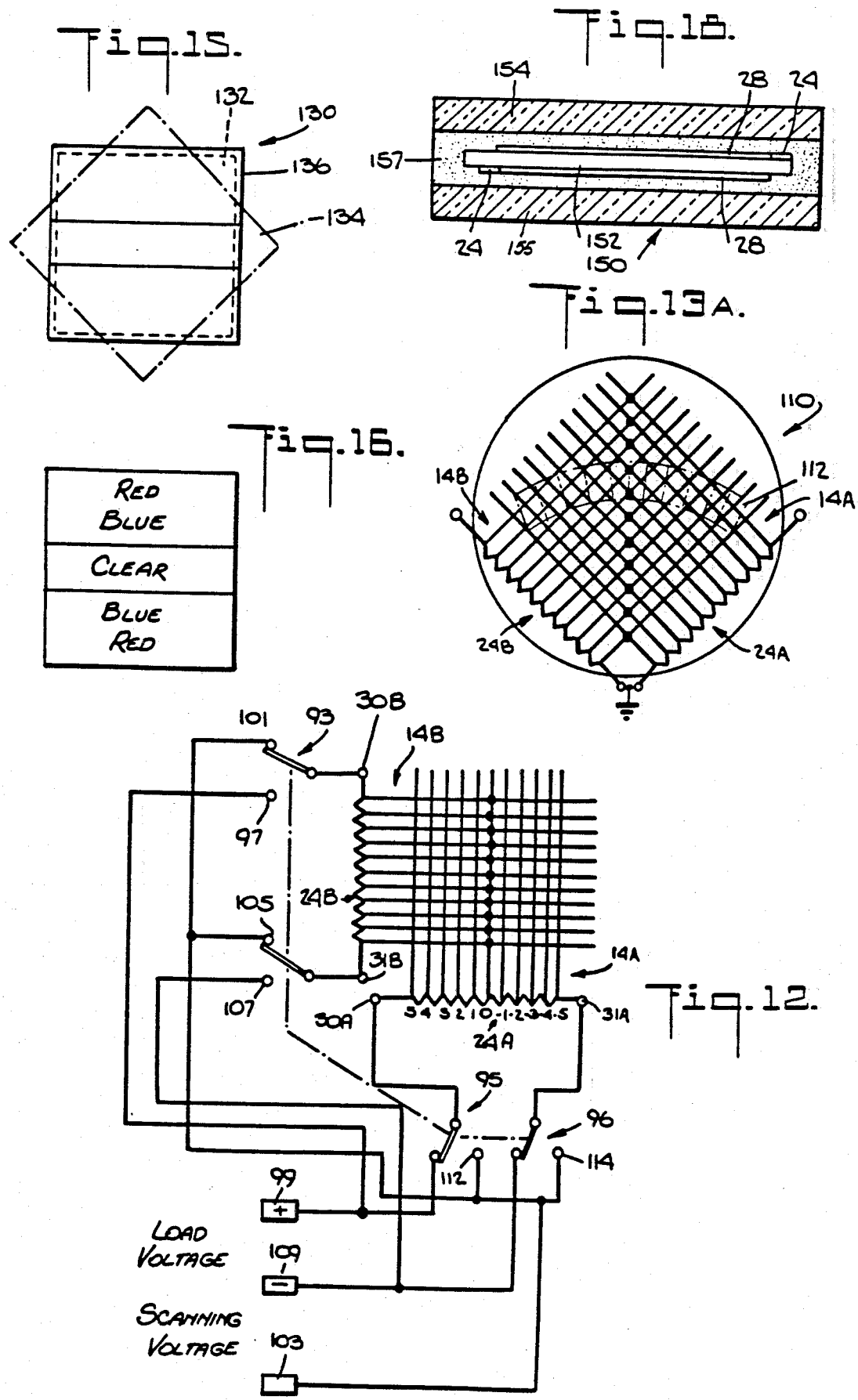

FIELD SENSITIVE OPTICAL DISPLAYS WITH ELECTRODES WITH HIGH AND LOW IMPEDANCE PORTIONS

This is a division of application Ser. No. 479,349 filed Apr. 1, 1983, now U.S. Pat. No. 4,493,531 which is a continuation of application Ser. No. 165,753 filed July 3, 1980 now abandoned.

BACKGROUND OF THE INVENTION

The present invention relates to field sensitive optical displays, particularly of the field effect and field excited types, and to the generation of the fields for activating the displays and to the scanning of the displays. More particularly, the present invention relates to liquid crystal, optoceramic and electroluminescence displays, and electrode and scanning arrangements therefor.

The present invention contemplates utilization of liquid crystal materials in which the propagation or characteristics of light incidence thereon can be altered by inducing an electric or magnetic field in the liquid crystal material. Such liquid crystal materials include, but are not limited to, nematic liquid crystal materials possessing dynamic or quiescent scattering, or twisted field-effect electro-optical properties, and the mixtures of those nematic liquid crystal materials with cholesteric liquid crystal materials.

In a dynamic scattering liquid crystal material, light is transmitted substantially unaffected through the material in the absence of a field. When a field of sufficient magnitude is induced in the liquid crystal material, light incident upon the material is optically scattered and transmission of light through the material is substantially prevented.

A quiescent scattering liquid crystal material possesses field effect electro-optical properties which are the converse of those of the dynamic scattering liquid crystal, that is, in the absence of a field, the quiescent scattering liquid crystal material scatters incident light, while a field induced in the quiescent liquid crystal material causes it to transmit incident light therethrough.

In a twisted nematic liquid crystal material, layers of molecules at opposed surfaces of the material can be caused to be aligned at an angle with each other in the absence of a field. The molecules between the opposed surfaces have varying angular alignments with the result that the molecular orientation through the material from one surface to the other is helical or "twisted." The plane of polarization of plane polarized light is rotated by the angle formed by the opposed surface molecules as the light passes through the liquid crystal material in the absence of a field. The application of a field to the material destroys the twisted alignment of the molecules with the result that the material transmits incident plane polarized light therethrough without substantial rotation of the plane of polarization.

Mixtures of nematic and cholesteric liquid crystal materials provide a storage characteristic to the scattering nematic liquid crystal materials. Such mixtures retain field-induced electro-optical characteristics after the field is removed. The application of an appropriate ac (alternating current) field returns the material to the state it normally possesses in the absence of a field.

Liquid crystal materials of the types referred to, as well as others, are well known in the prior art. See, for example, G. Heilmeier, "Liquid-Crystal Display Device," Scientific American, April, 1970, pp. 100-106; G. Heilmeier, L. Zanoni & L. Barton, "Dynamic Scattering: A New Electrooptic Effect in Certain Classes of Nematic Liquid Crystals," Proceedings of the IEEE, Vol. 56, No. 7, July 1968, pp. 1162-1171; and U.S. Pat. No. 3,918,796 on Nov. 11, 1975 to Fergason.

Nemati scattering liquid crystal electro-optical elements are well known in the prior art, as described, for example, in U.S. Pat. No 3,322,485, issued on May 30, 1967, to Williams. Twisted liquid crystal electro-optical elements which require the use of polarizing elements, are also well known in the prior art, as described, for example, in the aforementioned '796 Fergason patent. The Fergason '796 patent and U.S. Pat. No. 3,834,792, issued on Sept. 10, 1976, to Janning, describe two arrangements for aligning liquid crystal molecules in a display in order that polarized light passing through the material in the absence of a field is rotated. The Fergason '796 patent teaches rubbing each of the glass plates which enclose the liquid crystal material in a single predetermined direction and thereafter positioning the plates with the directions of rubbing of the plates forming an angle through which the polarized light is to be rotated. The Janning '792 patent teaches the growth of an alignment film on each plate and then the arranging of the plates with the directions of growth on each of the plates forming a desired angle with respect to one another. Both the Fergason '796 and the Janning '792 patents disclose arrangements of polarizers and twisted liquid crystal cells.

U.S. Pat. No. 3,820,875, issued on June 28, 1974, to William Bohmer, one of the applicants hereof, discloses devices utilizing field-effect scattering dielectrics, such as for example, nematic liquid crystal materials and mixtures of cholesteric and nematic liquid crystal materials. The '875 patent also discloses scanning devices incorporating such dielectrics. The disclosure of the '875 patent is incorporated herein by reference. The '875 patent also discloses display cells having both a a voltage gradiant can be generated and a conductive electrode. By applying suitable control voltages to such cells and combination of such cells, displays can be formed which include those having a movable dot or line. Sequential scanning of such cells can provide displays comprising patterns or images.

U.S. Pat. No. 3,675,988, issued on July 11, 1972, to Soref discloses liquid crystal display devices in which a variety of images, such as a moving bright spot, a variable length bar, a moving arrow and a moving window, can be generated. The Soref '988 patent discloses a liquid crystal display device which includes transparent electrodes uniformly coated on the surface of opposed plates enclosing the liquid crystal material. One of the electrodes has high resistivity with the result that a voltage gradiant can be generated along the extent of the electrode, i.e., each line location of the electrode will have a different voltage level.

U.S. Pat. No. 3,807,831 issued on Apr. 30, 1974 to Soref discloses a liquid crystal display device which includes interleaved arrays of alternate parallel electrodes. A field is induced between interleaved electrodes.

Prior art optoceramic devices are disclosed in C. E. Land, P. D. Thatcher and G. H. Haertling, Electrooptic Ceramics, Academic Press, 1974 at pages 137-233.

OBJECTS AND SUMMARY OF THE INVENTION

It is an object of the present invention to provide improved field sensitive optical devices.

It is another object of the present invention to provide simplified field sensitive display devices having a reduced number of terminals for selectively inducing fields in such display devices.

It is an additional object of the present invention to provide a simplified device for displaying a movable dot. It is yet another object of the present invention to provide simplified means for scanning such a device to provide desired images.

It is also an object of the present invention to provide a simplified device for displaying intersecting line images which can be moved independently of one another.

It is a further object of the present invention to provide a simplified device for displaying a line image capable of pivotal movement.

It is an additional object of the present invention, to improve the response time of liquid crystal display devices.

It is yet another object of the present invention to increase the life of liquid crystal display devices.

It is another object of the present invention to superimpose varying and dc fields in field sensitive material.

It is a further object of the present invention to provide a liquid crystal display device having an improved color display.

It is another object of the present invention to provide simplified electrode structures for the aforementioned devices.

It is also an object of the present invention to provide simplified address arrangements for providing the aforementioned displays and other displays.

Displays are provided, according to the invention, which utilize field sensitive materials and relatively simple addressing arrangements comprising a reduced number of terminals for inducing fields in or upon the material. In accordance with this aspect of the invention, one or both of the electrodes includes an impedance portion disposed in a non-active region in order to avoid affecting the field sensitive material. Further, in accordance with this aspect of the invention, there is provided a plurality of conductive, substantially low impedance elements extending in an active region in order to affect directly the field sensitive material. Each low impedance portion is in electrical contact with the impedance portion at a different impedance location thereof and extends therefrom. Only two terminals are required for the impedance electrode, i.e., one at each end of the impedance portion. An additional terminal may be provided for a capacitance disposed directly in contact with the low impedance portions. Devices having arrangements of such electrodes can provide a plurality of different displays by utilizing relatively simple addressing and scanning arrangements.

In the disclosed embodiments, the impedance portion is substantially resistive and the low impedance portions are substantially non-resistive. In describing such electrodes and electrode portions as being resistive or not-resistive, it will be understood that respective electrodes and portions may be impedance or low impedance, respectively. Also in the disclosed embodiments, opposed plates contain the field sensitive material and the electrodes are disposed in, on or adjacent the plates or in, on or adjacent the field sensitive material. The electrodes may be spaced with the field sensitive material therebetween, or substantially coplanar and disposed in or adjacent to the field sensitive material.

In one embodiment, one plate has disposed thereon, therein or adjacent thereto an electrode which includes a resistive portion extending generally parallel to the plate with a plurality of conductive, substantially non-resistive elements or portions connected thereto. The other plate has disposed thereon, therein or adjacent thereto a conductive and substantially non-resistive electrode which extends generally parallel to and substantially coextensive with the plate and opposed to the conductive elements. Selectively addressing the electrodes of this embodiment provides at least one region in the display bounded by conductive elements which is in contrast to the other regions of the display.

In another embodiment, both of the electrodes include a resistive portion with conductive, substantially non-resistive elements or portions connected thereto disposed in, on or adjacent to opposed plates, the conductive elements extending either transversely to each other in a grid pattern or parallel to each other. Selectively addressing the electrodes in accordance with the invention provides selected regions bounded by conductive elements to be made to contrast other regions.

In still another embodiment, both of the electrodes include a resistive portion with conductive, substantially non-resistive elements or portions connected thereto. The electrodes are disposed substantially in a common plane in or adjacent to the field sensitive material with the non-resistive elements of one electrode interleaved with those of the other electrode. Selectively addressing the electrodes provides selected regions extending transversely of adjacent interleaved non-resistive elements to be made to contrast other regions.

The aforementioned display embodiments may provide displays of a movable dot, individually movable intersecting lines, a pivoting line and other displays by means of various addressing schemes and various arrangements of the cells alone or with other optical elements, such as polarizers.

According to another aspect of the invention, liquid crystal material is utilized as the field sensitive material. A varying field (ac, i.e. alternating current, or a varying field with a dc component) is induced in the material and a dc field is superimposed on the varying field. The presence of the varying field can shorten the display response time of the liquid crystal material and can prolong the life of the crystal material.

In accordance with this aspect of the invention, the applicants have discovered that a varying field assists and speeds the molecules of a twisted nematic liquid crystal material in returning to their twisted or helical orientation after dc field which had aligned the molecules in the direction of the field is removed.

According to another aspect of the invention, an improved electrode arrangement is provided for superimposing a varying field (with or without a dc component) and a dc field in a field sensitive material, particularly a liquid crystal material. In accordance with this aspect of the invention, a capacitance is disposed across and coupled to the electrode and isolates the varying and dc voltages used to induce the fields. Varying and dc voltages may be applied either to the capacitance or to the electrodes. In one embodiment, the capacitances extend generally parallel to the electrodes and are substantially coextensive with the active regions of the plates. In another embodiment, the capacitances extend in strips generally parallel to the electrodes.

According to another aspect of the invention, cells containing twisted nematic liquid crystal material and polarizers are arranged to provide a gray display on a black background or a black display on a gray background. The electrodes are disposed in the cell in a manner such that a field is never induced in certain selected regions of the liquid crystal material while a field may be selectively induced in other regions of the liquid crystal material. Thus, certain selected regions of the liquid crystal material may never rotate the plane of polarization of plane polarized light passing through those regions regardless of the field induced elsewhere in the material. Cells with the twisted nematic crystal material and polarizers are arranged in accordance with this aspect of the invention to provide a moving or flying dot display as well as an independently movable intersecting line display.

According to yet another aspect of the invention, a cell containing a twisted nematic liquid crystal material is utilized with a polarizer in which selected portions of the polarizer transmit light therethrough without polarizing it. In accordance with this aspect of the invention static information or images may be displayed in conjunction with changing information or images.

In accordance with still another aspect of the invention, a color display is generated using cells containing twisted nematic liquid crystal material and polarizers.

According to other aspects of the invention, the field sensitive material is an optoceramic or an electroluminescent material.

These and other aspects of the present invention will be more apparent from the following description of the preferred embodiments of the invention taken in conjunction with the accompanying drawings and appended claims.

BRIEF DESCRIPTION OF THE DRAWINGS

The present invention is illustrated by way of example and not limitation in the figures of the accompanying drawings in which like references indicate similar parts and in which:

FIG. 1 is an elevation view in vertical section of a liquid crystal cell according to the invention depicting opposed plates each of which supports a pair of generally coextensive, dc isolated electrodes, with the liquid crystal material disposed between the pairs of electrodes and opposed plates;

FIG. 2 is an exploded perspective view of the liquid crystal cell of FIG. 1;

FIG. 3 is a perspective view of a liquid crystal cell according to another embodiment of the invention in which one of the dc isolated electrodes of each electrode pair is strip-like;

FIG. 4 is a plan view of one of the plates of the liquid crystal cell of FIG. 3 depicting an electrode disposed on the plate generally coextensive therewith and a strip-like electrode disposed thereon;

FIG. 5 is a plan view of the other plate of the liquid crystal cell of FIG. 3 depicting another electrode comprising a resistive portion and strip-like conductive portions disposed on that plate, the resistive portion being illustrated schematically, and a strip-like electrode disposed over the strip-like portions;

FIG. 5A is a diagram illustrating the resistive portion of the electrode of FIG. 5;

FIG. 6 is an exploded plan view of the liquid crystal cell of FIG. 3;

FIG. 8 is a diagram depicting the optical elements of FIG. 7 and illustrating the optical pattern of the light emerging from each of the optical elements;

FIG. 10 is a diagram illustrating the display pattern obtained from the arrangement of FIG. 9;

FIG. 11 is a perspective view of a liquid crystal cell according to another embodiment of the invention in which an electrode similar to that of the cell of FIG. 5 is disposed on each plate;

FIG. 12 is a schematic diagram of a display according to the invention which utilizes the liquid crystal cell of FIG. 11;

FIG. 13 is a schematic diagram of a display according to another embodiment of the invention utilizing the liquid crystal cell of FIG. 11;

FIG. 13A is a plan view of a meter instrument utilizing the liquid crystal cell of FIG. 13;

FIG. 14 is a schematic diagram of yet another display according to the invention utilizing the liquid crystal cell of FIG. 11;

FIG. 15 is a diagram depicting a liquid crystal cell/polarizer arrangement according to another embodiment of the invention for providing color displays;

FIG. 16 illustrates the color pattern produced by the arrangement of FIG. 15.

FIG. 17 is an elevation view of an optoceramic display cell according to the invention;

FIG. 18 is a plan view of the optoceramic cell of FIG. 17; and

FIG. 19 is an elevation view of another embodiment of an optoceramic cell according to the invention depicting an interleaved arrangement of portions of the electrodes.

DESCRIPTION OF THE PREFERRED EMBODIMENTS

Figure 7:
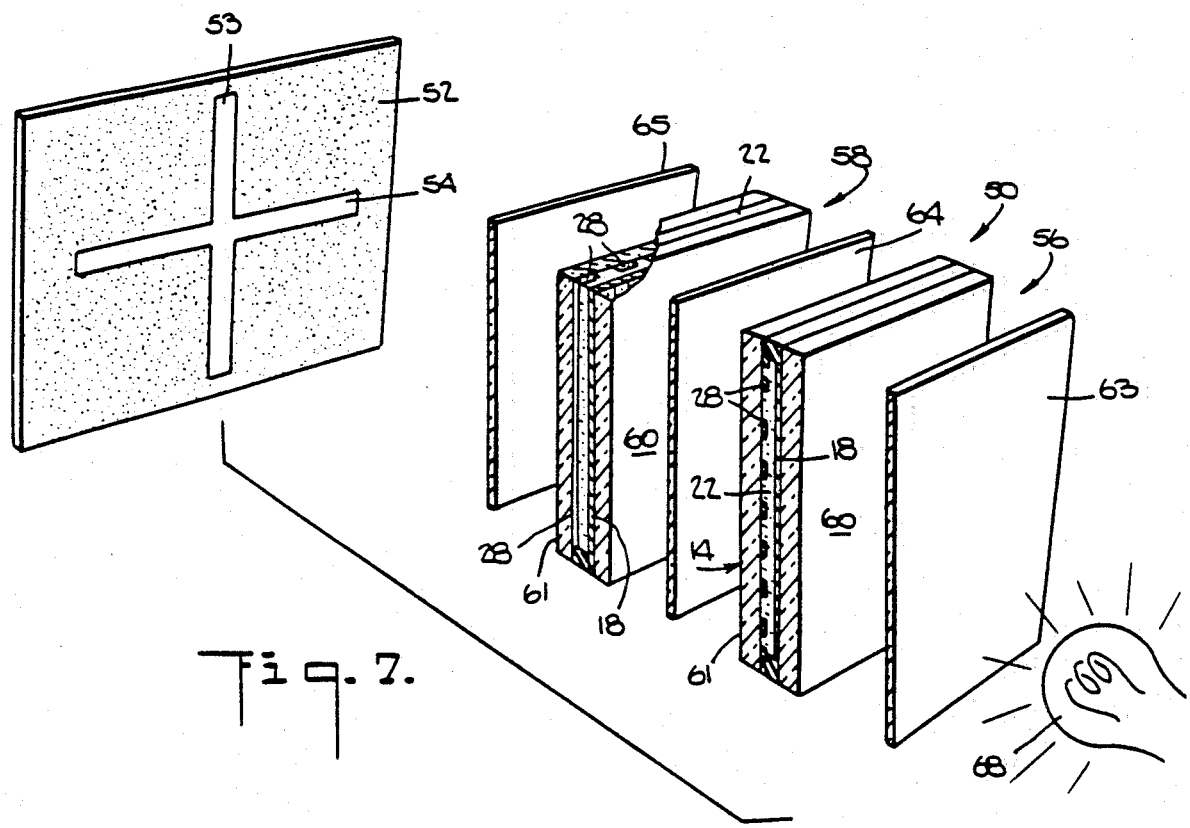
FIG. 7 is a perspective view in section of a liquid crystal cell/polarizer arrangement according to the invention utilizing the liquid crystal cell of FIGS. 3–6 with the section being taken vertically through the cells and the polarizers.

In the description of the preferred embodiments herein, various electrode structures are described for use with field-effect material, in particular, liquid crystal and optoceramic material. It will, however, be understood that such electrode structures can also be used in other field-sensitive materials, for example, field-excited materials such as, for example, electroluminescent materials.

Liquid crystal cells are illustrated in FIGS. 1–6 and 11 and optoceramic cells are illustrated in FIGS. 17–19 which include improved electrode structures. Various display patterns in accordance with the invention can be obtained utilizing cells according to the invention as illustrated in FIGS. 7–10 and 12–16, and in Tables I–III. Such illustrated displays and others described herein are intended to be exemplary and not exhaustive.

Referring to FIGS. 1–6, the improved electrode structure of cells 10 (FIGS. 1 and 2) and 10A (FIGS. 4–6) comprises a first electrode 14 disposed on or adjacent to one surface of a first transparent plate 16, preferably of glass, and a second electrode 18 disposed on or adjacent to one surface of a second transparent plate 20, also preferably of glass. The electrodes and the plates extend in parallel planes. In cell 10 illustrated in FIGS. 1 and 2, the electrodes 14 and 18 are disposed adjacent to and spaced from plates 16 and 20 respectively, while in cell 10A, illustrated in FIGS. 4-6, the electrodes are disposed on the surfaces of plates 16 and 20, respectively. Plates 16 and 20 are placed in a facing relationship, spaced apart from one another as shown in FIGS. 1 and 6. A liquid crystal material 22 is interposed between the spaced plates. In various figures, the electrode thicknesses and the spacing between different elements are exaggerated for clarity. Details for constructing a cell of the general type having opposed plates enclosing a liquid crystal material with an electrode disposed in, on or adjacent to each plate in contact with the liquid crystal material are known to those of skill in the art. Methods for applying electrodes to plates of the cells are also known to those of skill in the art.

Electrode 14 includes a resistive portion 24 extending parallel to the surface of plate 16. A plurality of substantially non-resistive, conductive strips 28 extend transversely from the resistive portion 24. The strips 28 have a finite width, "W" (FIG. 3), and are spaced apart by an interval ("S"). Each of strips 28 are electrically connected to resistive portion 24 at a different resistance point thereof. The interval of spacing between the strips 28 may vary depending on the display desired and the desired resolution of the display. The number of strips shown in FIGS. 1-6 is reduced for clarity. Terminals 30, 31 are connected to ends of resistive portion 24 of electrode 14. The resistive portion 24 is a substantially linear resistance with respect to its length. As shown in FIG. 5A, the resistive portion 24 may be a linear resistance disposed on plate 16 and extending in a generally sinuous path therealong. The conductive strips 28 are connected to spaced points of the resistance.

When a potential is applied across terminals 30, 31 and hence across resistive portion 24, each of strips 28 are at a different predetermined potential. In the disclosed embodiments of FIGS. 1-6, resistive portion 24 is linear and extends adjacent and substantially parallel to one edge 26 of plate 16, and each of strips 28 extend at substantially a right angle from resistive portion 24.

Electrode 18 extends uniformly across the surface of plate 20 and substantially coextensive with the active region thereof, and is conductive to the extent of being substantially non-resistive. A terminal 32 is electrically connected to electrode 18.

Referring now to FIGS. 1 and 2, electrodes 34a and 36a, which are dc isolated from electrodes 14 and 18, are provided for applying superimposed varying and dc fields to a liquid crystal material. Disposed generally coextensively on respective plates 16, 20 is a thin uniform, substantially non-resistive conductive electrode 34a, 36a, similar to conductive electrode 18. A thin uniform layer of insulating material 34b, 36b for example of silicon dioxide, is disposed generally coextensively on the respective conductor 34a, 36a for each plate 16, 20. Next the electrodes 14 and 18 are disposed on the insulating layers 34b, 36b on each plate. Liquid crystal material 22 is disposed between the electrodes. Layers 34a, 34b and 36a, 36b on each plate form capacitances 34 and 36. Terminal 38 is connected to conductor 34b of capacitance 34 and terminal 39 is connected to conductor 36b of capacitance 36.

By isolating conductive material 34a from the resistive portion 24 of electrode 14, the varying signal circuit through capacitances 34 and 36 does not pass through the resistive portion of electrode 14 but rather through the conductive strips 28.

Capacitances 34 and 36 permit a varying or dc field to be applied across the entire extent of the active liquid crystal region while electrodes 14 and 18 are used to provide a varying or dc gradient field, as will be described in more detail below.

Referring now to FIGS. 2-6, capacitances 34' and 36' are provided in contact with electrodes 14 and 16, respectively. Capacitance 34' comprises a strip of insulating material 34b (FIG. 6) on which a strip of substantially non-resistive, conductive material 34a is disposed, with the insulating material 34b in contact with the conductive strips 28 of electrode 14. Capacitance 36' comprises a strip of insulating material 36b on which a strip of substantially non-resistive, conductive material 36a is disposed, with the insulating material 36b in contact with electrode 18. The insulating material 34b of capacitance 34' is in electrical contact with each of strips 28 adjacent to locations where strip capacitance 34' extends transversely across each of the conductive strips 28. The insulating material 34b, 36b may be silicon dioxide, for example. In the disclosed embodiment of FIGS. 3-6, the capacitance strip 34' extends generally perpendicular to strips 28. A terminal 38 is connected to conductive layer 34a of capacitance strip 34' and a terminal 39 is connected to conductive layer 36a of capacitance strip 36', in order that a varying (ac with or without a dc component) signal may be applied to the liquid crystal material. By electrically connecting capacitance strip 34' to conductive strips 28, the circuit for the varying signal through the liquid crystal material is essentially resistance free, i.e., current of the varying signal does not flow through the resistive electrode portion 24. The capacitance strips 34' and 36' are disposed in non-active regions of the cell, that is to say regions of the cell where there is to be no display. Plates 16 and 20 can be somewhat off-set from each other (FIGS. 3 and 6).

Liquid crystal cells 10 and 10A can be operated in a dc (direct current) mode as generally described in the aforementioned '875 patent. The following brief description refers specifically to cell 10A of FIGS. 3-6, but is applicable to cell 10 of FIGS. 1-2 as well. Electrode 18 is utilized as the address electrode and electrode 14 is utilized as the load electrode. One side of dc source 40 is connected to terminal 30 of load electrode 14. Terminal 31 is connected to the other side (not shown) of the source. The magnitude of the voltage output of the dc source 40 depends upon the liquid crystal material being used. By way of example, for a twisted nematic liquid crystal material, the magnitude of the output of dc source 40 may be in the range adjacent about five volts. For a dynamic scattering nematic liquid crystal material, again by way of example, the magnitude may be in the range adjacent about 40 volts.

For purposes of illustration, it can be assumed that a twisted nematic crystal material is used and the output of source 40 is approximately five volts (positive). Since resistive portion 24 is linearly resistive, each of the conductive strips 28 will have a different predetermined unique voltage between 0 and about +5 volts. Thus uppermost conductive strip 28A (FIG. 5) will be at a voltage of about +5 volts, the center strip 28B will be at a voltage of about +2.5 volts, and the lowermost strip 28C will be at about 0 volts. A dc voltage source 42, variable between 0 and about +5 volts, is connected to terminal 32 of electrode 18. A zero potential field will then be present between one of the conductive strips and electrode 18 while fields will be induced between each of the other conductive strips 28 and the uniform electrode 18 with the magnitude of the individual fields being dependent upon the voltage output of the source 42.

For example, if the output voltage of source 42 is about +5 volts, then the potential difference between strip 28A (FIG. 5) and electrode 18 will be zero and there will be a potential difference between each of the other strips 28 and the electrode 18.

If the output of source 42 is selected to be about +2.5 volts, then the potential difference between strip 28B and electrode 18 will be 0 while at the same condition there will be a potential diffference between each of the other conductive strips 28 and the electrode 18.

Similarly, if the output of the voltage source 42 is 0, then the potential difference between strip 28C and electrode 18 will be 0 and there will be a potential difference between each of the other strips 28 and electrode 18.

In this manner, a field will be induced between all of the strips 28 and the electrode 18 except between the one strip and electrode 18 which have a zero potential as determined by the magnitude of the output voltage of source 42.

With a twisted nematic liquid crystal material, the region in which the zero potential exists will rotate the plane of polarization of plane polarized light as it passes therethrough while in other regions in which a field is induced, plane polarized light will pass therethrough without having its plane of polarization being rotated. The use of polarizers can provide either a white line on a black background or a black line on a white background.

When a dynamic scattering nematic liquid crystal material is utilized in cells 10 and 10A, the magnitudes of the voltage sources 40 and 42 are increased. For example, the magnitude of dc source 40 can then be in the range adjacent about +40 volts and the dc source 42 can be in a variable in a range extending between 0 and about +40 volts. With a dynamic scattering liquid crystal material, light is transmitted through the crystal material only in the region in which the zero potential exists. In all other regions, the liquid crystal material will scatter the light and thereby prevent its transmission through the liquid crystal material. Thus, light can be transmitted through the cells 10 and 10A in a line or bar form, depending upon the value of source 42.

With a mixture of a cholesteric liquid crystal material and a dynamic scattering liquid crystal material, the liquid crystal molecular alignment remains after a field has been removed. In order to "clear" the liquid crystal mixture and return the molecular orientation to the state it normally possesses in the absence of a field, an ac field can be applied to the liquid crystal mixture. Such an ac field can be applied to cell 10 by means of capacitances 34 and 36, and to cell 10A by means of capacitances 34' and 36', via terminals 38 and 39 which are isolated from the dc sources.

Cells 10 and 10A can also be operated according to the invention with a dc field and a superimposed varying field. The use of a varying field prolongs the life of liquid crystal material and can improve the response time of the cell, particularly a cell utilizing a twisted nematic liquid crystal material. The varying field may be an ac field or a field which is varied and includes a dc component.

In the case of a twisted nematic liquid crystal material, the application of a dc field of an appropriate magnitude destroys the helix or twisted alignment of the molecules and causes the molecules to orient themselves in the direction of the field. After the dc field is removed, the molecules relax and re-orient themselves again into the helix or twisted structure. The reorienting of the molecules after the field is removed results from the dipole moments of the molecules. The applicant has discovered that the reorientation of the molecules is speeded up in the presence of a varying field.

As is known to those of skill in the art, liquid crystal materials have a finite response time, that is, the molecules can respond to fields varying up to a predetermined rate. Beyond that rate, the field changes before the molecules can react. The applicants have determined that the rate of change of a field beyond which liquid crystal materials do not react is in and adjacent to the approximate range of 1–3 mhz, depending on the particular liquid crystal material. Such a varying field is referred to herein as a "relaxer" varying field. In accordance with the invention, superimposing a relaxer varying field and a dc field in the liquid crystal material in the cells 10 and 10A of FIGS. 1–6 provides an improved response time of the liquid crystal cell.

It is believed that the molecules of an unrelaxed liquid crystal material, i.e., a liquid crystal material in which a dc field is induced, which are aligned in the direction of the field and therefore do not rotate the plane of polarization of plane polarized light, are assisted in their return to their relaxed, rotated orientation when the dc field is removed in the presence of a relaxer varying field. Although not wishing to be bound by any particular theory, it is believed that the molecules closest to the surface of the plates of the liquid crystal cell, where the varying field is strongest, are assisted in relaxing and reorienting as a result of the influence of the relaxer varying field on the dipole moments. It is further believed that the molecules interiorly to the surface molecules are influenced by the reorientation of the surface molecules. This effect continues until all of the molecules have been relaxed and reoriented.

Thus, the superimposed relaxer varying and dc fields shorten the "turn-on" time of the liquid crystal.

The stronger of the superimposed relaxer varying and dc fields will dominate and determine the state of the liquid crystal material. For purposes of comparing the relative strengths of a relaxer, ac varying field and a dc field, an average or effective ac voltage and a dc voltage of the same magnitude provide fields of equal strength. Thus, such fields will effectively cancel each other and no effective field will exist. If the ac average or effective value is 5 volts (relaxer field) and the dc value is 4 volts, then the ac relaxer field dominates, and, in the case of a twisted nematic liquid crystal material, the material will be relaxed. If the dc value is 5 volts and the ac average or effective value is 4 volts (relaxer field), then the dc field dominates and orientes molecules of a twisted nematic in the direction of the field (non-rotated).

Particular address and scanning arrangements and liquid crystal cell arrangements for obtaining desired displays are described below.

An ac voltage is applied between terminals 38 and 39 of cells 10 and 10A to apply the relaxer varying field between each of the conductive strips 28 and the uniform electrode 18. The value (effective or average) of the ac source is sufficient to induce a field between each of the strips and the uniform electrode 18. For example, when using a twisted nematic liquid crystal material, the effective or average value of the ac relaxer voltage can be selected to be in the range adjacent approximately 5 volts. When using a dynamic scattering nematic liquid crystal material, the effective or average value of the ac voltage can be in the range adjacent approximately 40 volts. The frequency of the ac signal is selected to be sufficiently high so that the liquid crystal material does not react to the field, i.e., a relaxer ac field is induced. For example, the frequency of the ac signal can be selected to be in the range of about 1 to about 3 mhz. Since insulating material 34b of capacitance 34 (34') is coupled directly to conductive strips 28, the ac signal does not pass through the resistive portion 24 and therefore, the electrodes 14 and 18 provide a low impedance for the ac signal.

Table I illustrates by way of example and not limitation the operation of cells 10 and 10A which include a twisted nematic liquid crystal material in which are superimposed ac (relaxer) and dc fields. Electrode 14 is utilized as the load electrode and electrode 18 as the address electrode. Sources 40 and 42 apply dc voltages to the electrode to position a zero potential line as described above. Varying the dc voltage of source 42 moves the zero potential line. An ac voltage is applied between terminals 38 and 39. (The ac values given below and in Tables 1-3 are effective or average.) For example, +5 volts dc are applied to terminal 30 and +2.5 volts dc are applied to terminal 32, with terminal 31 grounded and the sources 40 and 42 also grounded. The dc voltage gradient generated for a ten conductor strip electrode in which each of the strips is equidistantly spaced along the linear resistive portion, is represented in the left column, each of the indicated voltages being present on a respective strip. To the right of the dc voltage gradient, Table I illustrates the state of the liquid crystal material, i.e., relaxed (twisted) or unrelaxed (untwisted), for the applied ac voltage indicated at the top of the respective column. Thus, when 0.25 v ac is applied between terminals 38 and 39, the ac relaxer field exists superimposed with each of the dc fields. Since 0.25 v ac is not strong enough to overcome any of the dc fields, only the zero potential line at 0 v dc is relaxed. If 0.5 v ac is applied, the ac relaxer field is now strong enough to overcome the ±0.5 v dc fields and the relaxed region of the liquid crystal material expands about the zero potential line. Increasing the ac voltage even further, widens the relaxed region. It is important to note that an increase in the ac voltage causes unrelaxed regions to relax and thus speeds the time response of the material in going from the unrotated to the rotated orientation. It should be mentioned that the ac and dc fields exist only between a conductive strip 28 and the uniform electrode 18, and not in regions adjacent the spaces between the strips.

The zero potential line may be positioned as described above, i.e., by changing the address voltage to terminal 39. Again, in repositioning the zero potential line, a previously unrelaxed region will be caused to relax in the presence of an ac field.

The twisted nematic liquid crystal cells 10 and 10A can also be operated with ac voltages (relaxer) applied to the address and load electrodes (terminals 31 and 30), and a pulse signal applied to the capacitances (terminals 38 and 39). In this example, +5 v ac is applied to terminal 30 and +3 v ac is applied to terminal 32 in phase with the +5 v ac voltage. The ac voltage gradient for a ten conductor strip electrode is represented in the left column of Table II. To the right of the ac voltage gradient, Table II illustrates the state of the liquid crystal material for the indicated pulsed dc voltage applied between terminals 38 and 39. Changing the dc voltage widens the unrelaxed region. Thus, the cells 10, 10A in this example are operated conversely to that of the cells of Table I. In this example, the ac relaxer field does not substantially improve response time in that relaxed regions are changed to unrelaxed regions by the ac and dc voltages applied.

A curtain effect can be obtained in the operation of twisted nematic liquid crystal cells 10 and 10A by proper selection of the voltages. This is accomplished by offsetting the location of the zero potential line from the center and selecting the voltage applied to the capacitance terminals to be sufficiently large to cause all but the offset region to be in one state while the offset region is in the other state. Table III illustrates this for a cell connected as described in connection with Table I with 5 v dc applied to terminal 30 and 4 v dc applied to terminal 32. A line or bar display can be obtained by positioning two cells adjacent to each other with regions of registration determining the line or bar.

FIG. 7 illustrates an arrangement 50 of twisted nematic liquid crystal cells and polarizers for providing a visual display 52 of independently movable, intersecting lines 53, 54. The liquid crystal cells 56, 58 are of the type which include opposed parallel transparent rubbed glass plates 60, 61. The plates are positioned with the directions of rubbing intersecting one another. As is known in the art, a twisted nematic liquid crystal material disposed between the rubbed glass plates when transmitting plane polarized light incident thereon rotates the plane of polarization over the angle formed by the intersecting directions of rubbing of the glass plates.

The rotating effect on the plane of polarization of such liquid crystal cells can be cancelled by inducing an electric field in the liquid crystal material within the cell or in selected regions thereof. When such liquid crystal cells are utilized with polarizers, visual displays are formed in dependency on the regions of the liquid crystal material in which an electric or magnetic field is induced.

The liquid crystal cell/polarizer arrangement 50 of FIG. 7 includes liquid crystal cells 56, 58 of the general type illustrated in FIGS. 1-6 and plane polarizers 63-65. The cells 56, 58 are of the type which rotate the plane of polarization of plane polarized light in the absence of an electric field induced in the liquid crystal material. These cells transmit plane polarized light with the plane of polarization substantially unrotated when an electric field is applied to the liquid crystal material.

The liquid crystal cell/polarizer arrangement 50 of FIG. 7 provides the display 52 of individually movable intersecting lines 53 and 54. In the preferred embodiment illustrated in FIG. 7, the display 52 comprises lines 53 and 54 which intersect at a right angle. This corresponds to the disposition of cells 56 and 58 so that the conductive strips 28 intersect at a right angle. Each of the lines 53 and 54 may be independently positioned along the plane of the display in dependence upon the field pattern induced in the liquid crystal cells 56 and 58. The display illustrated in FIG. 7 can be used as a crosspointer indicator such as an aircraft instrument landing system (ILS) indicator.

Each of cells 56 and 58 includes opposed parallel glass plates 60, 61 which have been rubbed along directions intersecting at a right angle. The electrode structure disposed on the glass plates of cells 56 and 58 is similar to the electrode structure depicted in FIGS. 1-6. Such an electrode structure comprises a uniform conductive electrode 18 disposed on one glass plate 60 and an electrode 14 disposed on the other glass plate 61 which includes a linearly-resistive portion 24 and spaced conductive strips 28 electrically connected to the resistive portion 24.

Conductive strips 28 have a width "W" and are separated by an interval or space "S" (FIG. 3). In the embodiment in FIG. 7, the width of the strips and the spaces between adjacent strips are substantially equal, i.e., W/S approximately equals one. As described above for the dc mode operation, a fixed dc voltage is applied across terminal 30 (the terminals are not shown in FIG. 7 for purposes of clarity) of the resistive portion 24 of electrode 14 and terminal 31. A different unique dc voltage is present on each of the conductive strips 28. A dc voltage is also applied to terminal 32 of the uniform electrode 18, utilizing a variable dc source, to provide a selected uniform dc voltage across the surface of electrode 18. A different unique potential will be present between each of the electrode strips 28 and the uniform electrode 18 while a zero potential region will exist between one of the conductive electrode strips 28 and the uniform electrode 18. The voltage magnitude of the variable dc source 42 determines the precise location of the zero potential region. By varying the voltage output of the variable dc source, the location of the zero potential region can be changed.

As mentioned above, liquid crystal cells 56 and 58 are constructed with the conductive strips 28 of the electrode 14 of the individual cells extending at right angles to each other. Such an arrangement can provide zero potential regions in the respective cells which extend horizontally in cell 56 and vertically in cell 58. As a result cell 56 will have positionable horizontally-extending zero potential regions while cell 58 will have positionable vertically-extending zero potential regions. Zero potential regions also exist in the regions of the liquid crystal material bounded on one side by the spaces between adjacent strips 28. Since no electrode portions are disposed on plate 61 in such spaces, no field is induced in those regions regardless of the voltages applied to the electrodes. Thus, additional horizontally and vertically extending zero potential regions will be present in the respective cells in addition to the single selected and adjustable zero potential region in each cell, the location of such latter regions being determined by the voltage applied to the electrodes. For clarity, only nine conductive strips have been illustrated in the cells of FIG. 7.

Referring now to FIG. 8, the optical pattern obtained from the arrangement of FIG. 7 is depicted. In FIG. 8, the arrow associated with polarizers 63-65 indicates the direction of the plane of polarization of plane polarized light which each polarizer will pass. The arrows associated with cells 56, 58 indicate the director of the plane of polarization of plane polarized light emerging from regions of the cells in which no field is present. The arrows in the display patterns 72, 74, 76 and 78 between the optical elements indicate the plane of polarization of the light, while darkened regions indicate an absence of light.

As depicted in FIG. 8, the polarizers 63-65 are crossed at right angles to one another. Then polarizers 63 and 65 plane polarize light vertically, i.e., in the Y direction, and polarizer 64 plane polarizes light horizontally, i.e., in the X direction.

Liquid crystal cell 56 shown in FIG. 7 has its rubbed glass plates 60, 61 disposed such that vertically plane polarized light incident upon the cell will be rotated 90° and emerge as horizontally plane polarized light in the absence of a field. Cell 58 shown in FIG. 7 has its rubbed glass plates 60, 61 disposed such that horizontally plane polarized light incident upon the cell will be rotated 90° and emerge as vertically polarized light in the absence of a field. Thus, the directions of rubbing of the respective plates of the two cells are offset by 90° such that the plane of the polarized light emerging from the cells is offset by 90° in the absence of fields in the cells.

Non-polarized light from lamp 68 passes through polarizer 63 and emerges as vertically polarized light as illustrated at 70 in FIG. 8. Voltages are applied to the electrodes of cell 56 to provide a zero potential as a result there is no field in a region extending in a horizontal line across the center of the cell bounded on one side by the center conductor strip 28B. At the same time, a field is induced in the other regions of the cell bounded on one side by the remaining conductor strips 28. In the regions bounded on one side by the spaces between the conductor strips, there is no electric field. Plane polarized light passing through the regions not subjected to a field, i.e., the central horizontal region adjacent conductor strip 28B and the regions in cell 56 bounded on one side by the spaces, will have its plane of polarization rotated. As a result the light will emerge as horizontally polarized light. In other regions, the plane of polarization of light will not be rotated and will emerge as vertically polarized light.

The polarization pattern of the light emerging from cell 56 is illustrated at 72 in FIG. 8 with the arrows indicating the directions of the planes of polarization. Since the zero potential region has spaces on each side as indicated by the dotted lines, the central region of the display pattern will be larger than any of the other regions. Polarizer 64 will transmit only horizontally plane-polarized light and thus only the horizontally polarized light in the horizontally-extending regions will be transmitted through the polarizer 64 to produce the alternating light pattern indicated at 74. The regions without light are dark and the plane of polarization in the remaining regions is horizontal.

Voltages are applied to the electrodes of liquid crystal cell 58 to provide a zero potential and hence no field in a region extending in a vertical line across the center of the cell, bounded on one side by the center conductive strip 28B. A field is induced in the regions of the cell bounded on one side by the other conductive strips 28. As a result, no electric field is induced in the regions of the cell which are bounded on one side by the spaces between the conductor strips.

The plane of polarization of the horizontally-polarized light incident on cell 58 is rotated 90° as it passes through the vertically-extending zero potential regions. In the other regions, the horizontally plane-polarized light is not rotated as it passes through the cell and therefore emerges as horizontally plane-polarized light. The central horizontal region is larger than the other regions for the reason given in connection with cell 56. The polarization pattern of the light emerging from cell 58 is illustrated at 76. Again, darkened regions indicate an absence of light and in other regions, the arrows indicate the direction of the plane of polarization.

Only vertically plane-polarized light is transmitted through polarizer 65. The light pattern transmitted through polarizer 65 is illustrated at 78. At the intersection of the vertically extending central region and horizontally extending central region, all the light is transmitted. In the four corner regions, light is transmitted in a checkerboard fashion. As discussed, the width of the light transmitted in the horizontally and vertically extending central regions is approximately several times wider than the light regions in the checkerboard corner portions. The reason for this is that the zero potential field produced by the voltages is bounded on both sides by zero potential regions resulting from spaces between the conductive strips 28.

The ratio of conductive strip width to the width of the intervals between conductive strips and the number of conductive strips disposed in a given cell area determine the composite display. If the spacing and the width of the conductive strips are chosen to be in the ratio of one to one and the number of conductive strips is relatively large, the four corner areas will appear to be gray rather than having a checkerboard pattern. Since the vertically and horizontally extending zero potential regions are several times wider than the individual checkerboard regions, wide horizontally and vertically intersecting lines will generally appear. Thus, the display will appear as a pair of intersecting generally white lines on a generally gray background. Each of the lines can be individually positioned, i.e., the horizontally extending line can be moved vertically and the vertically extending line can be moved horizontally, depending on the specific voltages applied to the individual cell 56, 58.

It is also possible to obtain intersecting generally black lines on a generally gray background by rotating the center polarizer 64 by 90° so that all of the polarizers 63-65 transmit only vertically plane-polarized light. Additionally, it is also necessary to provide a cell 58B (not shown) in which the plane of polarization of light to be transmitted through the zero potential regions is horizontally polarized.

It is also possible to obtain other displays with the cell/polarizer arrangement shown in FIG. 7. For example, if the spacing between the conductive strips of the cells is small compared to the width of the conductive strips, then a single zero potential region will essentially be produced by the voltages applied to the cell electrodes. Such an arrangement with the polarization directions indicated as in FIG. 8 will produce a display having a generally white dot on a generally black background. The white dot results from the intersection of the vertically and horizontally extending zero potential regions of the two cells. This display can be scanned as will be described below.

It is also possible to obtain a display of intersecting generally white lines on a generally black background. Such a display can be obtained where the spacing between the conductive strips is small as compared to the width of the strips and voltages are sequentially applied to the cells to generate sequentially the vertically and horizontally extending zero potential regions. Thus, in one scan, voltages will be applied to cell 56 to provide a horizontally extending zero potential region while no voltage is applied to cell 58. In a subsequent scan, no voltage is applied to the cell 56 while voltages are applied to cell 58 to provide a vertically extending zero potential region.

Figure 9:
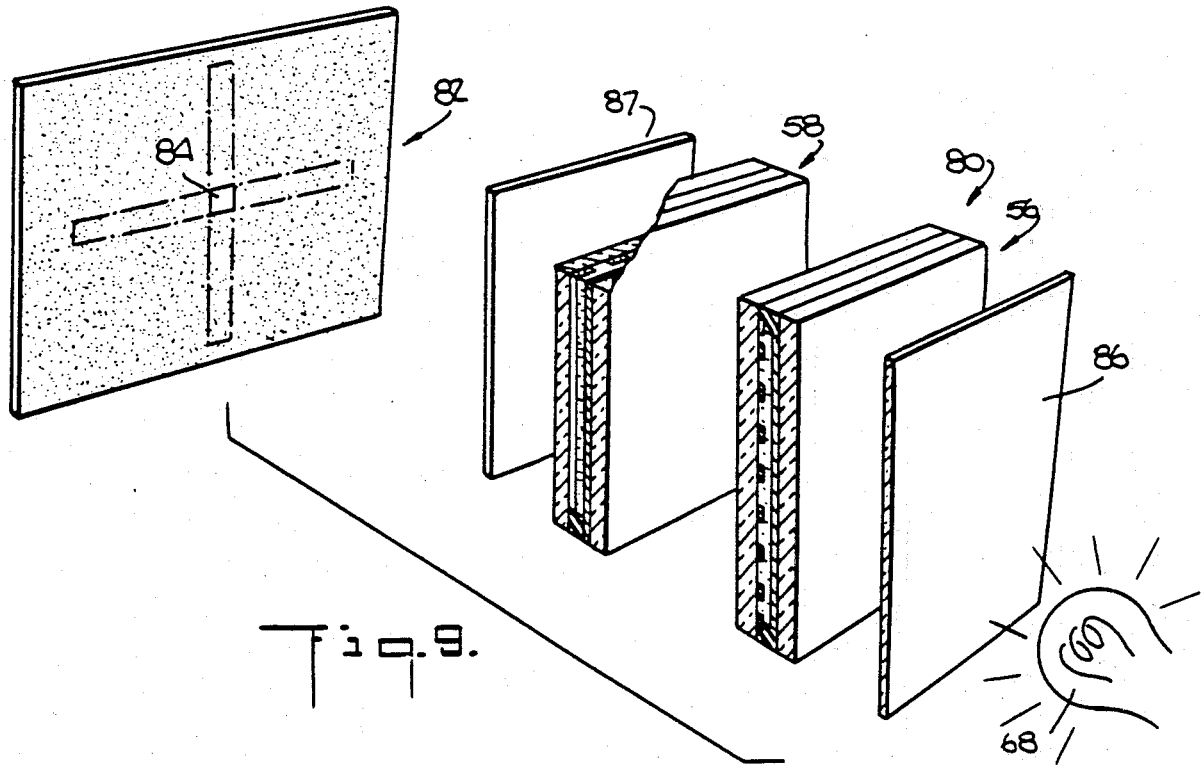
FIG. 9 is a perspective view in section of another liquid crystal cell/polarizer arrangement according to the invention and utilizing the liquid crystal cell of FIGS. 3–6 with the section being taken vertically through the cells and polarizers.

Referring now to FIG. 9, another arrangement 80 of polarizers and twisted nematic liquid crystal cells is depicted. The arrangement 80 utilizes two liquid crystal cells and two polarizers to provide a display 82 of a moving dot 84. When the conductive strips 28 are spaced, a black dot on a gray background or a white dot on a gray background will be displayed, depending upon the direction of the plane of polarization of polarizers 86 and 87 and the disposition of cells 56 and 58. With cells 56 and 58 disposed as described for FIG. 8 and polarizers 86 and 87 positioned to pass vertically plane-polarized light, a central black dot will appear on a gray background.

The light pattern emerging from cell 58 is illustrated in FIG. 10 with the arrows indicating the directions of the planes of polarization. The pattern is a checkerboard one with the center checkerboard square being considerably larger than any of the other checkerboard squares. The reason for this is that the vertical and horizontal spaces adjacent the center do not rotate the plane-polarized light while the intersection of the central horizontally extending zero potential region with the central vertically extending zero potential region rotates plane-polarized light 180°. The checkerboard light pattern provides a generally gray background. When polarizers 86 and 87 are crossed, a generally white dot will then appear on a generally gray background. As discussed, only in the larger central region is there an absence of a checkerboard light pattern. Thus, the resulting display will be either a generally white dot or a generally black dot on a generally gray background.

When the conductive strips 28 are closely spaced, essentially no zero potential regions exist between the electrode strips. It is then possible to obtain a display 82 of a generally white dot on a generally black background or a generally black dot on a generally white background.

A moving dot scan can be obtained as follows. Each cell 56, 58 scans the display in one direction. For example, cell 56 scans in the Y-direction and cell 58 in the X direction. Scanning in one direction is accomplished by maintaining the voltages applied to the electrodes of one cell fixed, while the voltage applied to the uniform electrode of the other cell is varied. For example, a scan in the Y-direction along a single vertica line is obtained by maintaining the voltages applied to the electrodes of cell 58 fixed, while the voltage applied to terminal 32 of cell 56 is varied. The voltage applied to the uniform electrode of cell 58 will determine the X-location of the verticle line that is scanned. Cell 56 provides a horizontally-extending zero potential region.

Varying the voltages to the terminals 32 of the uniform electrodes of both cells will provide a simultaneous XY scan. If the voltages are varied at the same rate and progress simultaneously through the same voltage levels, then the scan path will be diagonally through the display.

When the source is varied at a uniform rate between its maximum and minimum voltages, and where the rate of change of voltage is such that the liquid crystal materials are permitted to relax at each zero potential point, the entire area of the two cells may be sequentially scanned by the moving dot.

By adjusting the rate of voltage variation relative to the relaxing time of the particular material, it is possible for each incremental dot along the scan path to be either rendered completely visible due to the complete relaxation of the material, rendered partly visible due to the partial relaxation of the material, or to remain invisible due to the lack of relaxation of the material. Thus, the precise adjustment of the rate of change of the voltage of the source connected to terminal 32 of the cells permits the creation of transmitted tones ranging from black through gray to white at each point along the scan. Modulation of the rate of voltage change can create complete image transmission. As described above, dc and varying fields may be applied superimposed. This reduces the turn-on time for the liquid crystal material with the result that the rate of change of the address voltage may be increased to increase scanning speed.

Since the turn-off time of the liquid crystal material is relatively slow compared to the turn-on time, the turn-off time can act effectively as a persistance and, accordingly, the entire display can be scanned before the liquid crystal material turns off. This feature of the invention permits operation of the display for imaging.

Referring now to FIG. 11, a field sensitive cell 90 is depicted in which electrodes 14A, 14B, similar to electrode 14, are disposed on each of the plates 91 and 92. The conductive strips 28 of the opposed electrodes 14A, 14B extend perpendicular to each other, thereby forming a grid pattern. Capacitances 34' are disposed in contact with the strips 28 of the respective electrode. Terminals 30A, 30B and 31A, 31B are connected to ends of respective resistive portion 24A, 24B of each of the electrodes, while terminals 38A, 38B are connected to the respective capacitance strips 34' disposed on each of the electrodes. The opposed plates 91, 92 are offset in order that the capacitance strips 34' are in the nonactive region of the cell 90. Although now shown, capacitances 34 and 36 can be provided for cell 90 as described for cell 10A of FIGS. 1-2.

Referring now to FIG. (12), an embodiment of the invention is schematically illustrated in which the cell 90 is utilized. The terminals 30A, 31A, 30B, 31B of each of the resistive portions 24A, 24B of each of the electrodes 14A, 14B are connected to respective poles of switches 93-96. The switches 93-96 are ganged to operate in unison. Contact 97 of switch 93 is connected to the positive supply 99 and contact 101 of switch 93 is connected to a variable dc supply 103. Contact 105 of switch 94 is also connected to the variable dc supply 103 and to contact 101. Contact 107 of switch 94 is connected to the negative dc supply 109. Similarly, switch 95 has a contact connected to the positive supply and a contact connected to the variable dc supply. Switch 96 has a contact donnected to the negative supply and a contact connected to the variable dc supply with the contacts 112, 113 of switches 95 and 96 being connected together and to the variable dc supply.

In operation, in one position of switches 93-96, one of the electrodes is operated as an address electrode while the other electrode is operated on the load electrode. In the other position of switches 93-96, the load and address electrodes are reversed.

For purposes of illustration, a twisted nematic liquid crystal material is contained in cell 90 and the magnitude of the positive and negative voltage supplies can be five volts. With the switches in the positions shown by the solid lines in FIG. 12, electrode 14A is the address electrode and electrode 14B is the load electrode. Positive 5 volts is applied to terminal 30A of resistive portion 24A of electrode 14A and negative 5 volts is imposed at electrode 31A of resistive portion 24A. For clarity, ten conductive strips have been shown for each of the electrodes. The voltage at each of the conductive strips for electrode 14A is indicated, +5 and −5 volts being present at the right-most and left-most conductive strips, respectively, with the voltages on each of the other strips diminishing toward the center. Accordingly, the central strip has zero volts. Terminals 30B and 31B of electrode 14B are connected together and to the variable dc source 103. Since essentially no current flows through the electrode 14B from source 103, each of the conductive strips and each portion of the resistive portion 24B will be at the same voltage. The variable dc voltage applied to electrode 14B therefore appears simultaneously across all of the conductive strips.

A series of zero potential points is generated at the intersection of conductive strips which are at the same potential Thus, with +5 and −5 volts from sources 99 and 109 applied to electrode 14A and with zero volts applied to conductor 14B from variable source 103, a series of zero potential points is generated extending vertically through the center of the cell.

When the switch positions are reversed from those shown in FIG. 12 when +5 or −5 volts from sources 99 and 109 are applied to electrode 14B, and when zero volts is applied to electrode 14A from source 103, a series of zero potential points is generated which extend horizontally along the center of the cell (not shown).

When the switch positions are switched at a frequency which is faster than the rise and decay time of the liquid crystal material, only the single point intersection of the horizontally and vertically extending series of points will appear visible. Under this condition, a dot appears in the center of the display. The dot can be moved by varying the voltage output of the variable dc source 103. A moving dot can thereby be obtained.

As discussed above, the moving point or dot can be used as a scanning device. In one switch position, scanning in the X direction is carried out, while in the other switch position, scanning in the Y direction is carried out.

Since the turn-off time of the liquid crystal material is relatively slow compared to the turn-on time, the turn-off time acts like a persistence, and the entire display can be scanned before the liquid crystal material turns off. This feature of the invention permits operation of the display for imaging. Computer or microprocessor controls can be utilized for voltage generation and switching to provide scanning and image display.

Referring now to FIG. 13, terminals 30A, 31B of each of the electrodes 14A, 14B of cell 90 are connected together and to ground. The cell 90 in FIG. 13 is capable of providing a pivoting or swinging line display. Each of the terminals 31A, 30B is connected to a variable dc source of the same polarity. When an equal voltage of sufficient magnitude (for example 5 volts for twisted nematic liquid crystal material) is applied to each of terminals 30B, 31A of the two electrodes, then a series of zero potential points are generated at the intersection of the conductive strips along the diagonal of the cell. If the voltage on terminal 31A of electrode 14A exceeds that of terminal 30B on electrode 14B, then the line is pivoted or swung counterclockwise from the diagonal. If the magnitude of the voltage on terminal 31A of electrode 14A exceeds that of terminal 30B of electrode 14B, then the line is pivoted or swung clockwise.

The cell 90 in FIG. 13 can be used as a meter 110 as shown in FIG. 13A in which the line formed by the dots is the meter needle. Static information such as values of the parameter being measured associated with indication lines 112 can be disposed on the cell. When cell 90 is used with a twisted nematic liquid material and polarizers, then the static information can be provided in the display by removing selected areas of the polarizers. Thus, light passing through the selected areas in the polarizers will not be blocked.

Referring now to FIG. 14, a cell 120 can be utilized as a meter display. Cell 120 includes electrodes 114A and 114B in which the resistive portions 124A, 124B each have end terminals, and an intermediate terminal in the center of the respective resistive portion which is grounded. Cell 120 can provide a pivoting line display which pivots 360° about the center of the display rather than 90° about a corner of the display as in FIG. 13. The display of FIG. 14 can be used for a meter in which the needle is pivotable over a full 360° range. Only half of the needle in FIG. 14 is displayed, one half of the needle being blocked out when it is an inactive quadrant. A positive and a negative voltage is applied to respective terminals of the resistive portions. Otherwise, the display of FIG. 14 operates similarly to the display of FIG. 13.

Referring now to FIGS. 15–16, a liquid crystal cell arrangement 130 is shown for providing a color display from liquid crystal cells of the type which include a twisted nematic liquid crystal material. The liquid crystal cell 132 is of the type illustrated in FIGS. 1–6 which provides a horizontally or vertically-extending zero potential bar or line. The cell 132 is disposed between polarizers 134 and 136 which are placed so that the planes of polarization are at an angle of 45° to each other.

In a nematic liquid crystal material which is placed between 45° polarizers, colors appears when a field is induced in the liquid crystal material at values between the threshold and saturation points of the liquid crystal material. All colors of the spectrum are generated in rainbow fashion in adjacent bands of the liquid crystal material. When a zero potential line or bar exists in the liquid crystal material, the bands surround the zero potential region and extend therefrom in both directions. The two color bands surrounding the zero potential line are identical with the colors closest to the zero potential region being the same. The individual colors are located precisely with respect to the zero potential region. The red band is located closest to the zero potential region and the ultra-violet is located furthest from the zero potential region. These colors can be reversed by reversing the polarity of the field. This phenomenon of color generation using a twisted liquid nematic crystal material and polarizers positioned at a 45° angle to each other is known in the art; however, it has not heretofore been possible to control the location of the colors in the liquid crystal material, accurately.

According to the invention, the liquid crystal material can be scanned as described above and the color locations precisely and accurately positioned. Scanning moves the zero potential region over the liquid crystal cell and thereby moves the spectrum over the cell. To obtain a particular color for a display, display cells which transmit light are positioned adjacent cells which produce color. The dot of a moving dot display is aligned with the desired color in the cell and thereby the color is transmitted through the dot.

Referring now to FIGS. 17–19, the display device 150 utilizes an optoceramic material 152, for example piezoelectric lead zirconate titanate (PLZT), as the field sensitive material. The optoceramic material rotates the plane of plane polarized light passing therethrough by 90° in the presence of a field and transmits plane polarized light therethrough substantially unrotated in the absence of an appropriate field.

Referring to FIGS. 17 and 18, cell 150 includes opposed, transparent spaced plates 154, 155 preferably of glass. Interposed between the plates is a gelatin material 157 which supports therein a wafer 152 of optoceramic material. Electrodes 14 are disposed on opposed surfaces of or imbedded within opposed sides of the wafer. The conductive portions 28 of electrodes 14 face and extend parallel to each other and induce fields in wafer regions bounded on each side by pairs of the conductive strips. The resistive portions 24 are disposed in nonactive regions of the cell.

Polarizers can be disposed adjacent the sides of cell 150 to provide desired displays, the polarizers being positioned so that the planes of polarization are at a 45° angle. Cell 150 is addressed as above described in connection with other cells to obtain displays as described above and other displays. The magnitude of the voltage applied to the cell electrodes to induce a field in the presence of which plane polarized light is transmitted unrotated is from about 0 to about 800 volts, depending on the thickness of the wafer and the particular optoceramic material.

Referring now to FIG. 19, the electrodes 14 of cell 150A may both be disposed in the same plane on a surface of or imbedded within the optoceramic material with the conductive strips 28 interleaved. This arrangement induces transverse fields between adjacent interleaved strips, the fields extending into the optoceramic material between adjacent conductive strips.

Cells 150 and 150A may also comprise other electrode arrangements as described above and the cells described above may comprise the electrode arrangements of cells 150, 150A.

Although not illustrated or described specifically, the liquid crystal cells in FIGS. 7, 9 and 12–15, may incorporate the capacitances described in connection with FIGS. 1–6 and 11. Additionally, certain cells have been described in connection with twisted nematic liquid crystal material. It will be understood that such cells may operate with a dynamic or quiescent scattering liquid crystal material to obtain certain of the display patterns described herein and other display patterns.

While description of the preferred embodiments has been made in connection with liquid crystal and optoceramic cells, other field sensitive cells may be utilized, such, for example, electroluminescent cells. Further by way of example, the electroluminescent materials which can be employed include zinc sulphide doped with manganese. Such materials can generate light at 300 volts ac while being unexcited at dc voltages and at lower ac voltages. The displays can otherwise be generated as described above.

Additionally, it is possible to obtain some or all of the display patterns described herein utilizing a resistive electrode on one of the plates of the display in which the resistive electrode varies in resistance along a "zig-zag" path across the extent of the plate, as described in the aforementioned '875 patent.

Moreover, it is possible to obtain a display pattern described in connection with a specific embodiment in other embodiments.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention herein chosen for the purpose of the disclosure without departing from the spirit and scope of the invention.

TABLE I

| DC GRADIENT | ac 0.25 | 0.5 | 1.0 |
|---|---|---|---|
| 2.5 to 1.5 | unrelaxed | unrelaxed | unrelaxed |
| 1.0 to 0 | relaxed | relaxed | relaxed |
| −0.5 to −2.5 | unrelaxed | unrelaxed | unrelaxed |

TABLE II

| AC GRADIENT | dc 0v | 0.25v | 0.5v |
|---|---|---|---|
| 2.0 to 1.0 | relaxed | relaxed | relaxed |
| 0.5 to −0.5 | relaxed | unrelaxed | unrelaxed |
| −1.0 to −3.0 | relaxed | relaxed | relaxed |

TABLE III

| DC GRADIENT | ac 3v | 2.5v | 2.0v |
|---|---|---|---|
| 1 to −0.5 | relaxed | relaxed | relaxed |
| −1.0 to −2.5 | unrelaxed | unrelaxed | unrelaxed |
| −3.0 to −4.0 | unrelaxed | unrelaxed | unrelaxed |

What is claimed is:

1. Display apparatus comprising first and second liquid crystal cells, each comprising spaced apart opposed first and second transparent plates and a twisted nematic liquid crystal material disposed between the plates, means for aligning the molecules of the liquid crystal material in the absence of a field to rotate the plane of polarization of plane polarized light passing through the material through a predetermined angle, first and second electrodes disposed adjacent to the first and second plates respectively of each of the first and second liquid crystal cells and in contact with the liquid crystal material, the first electrode of the first and second cells comprising a linearly-extending resistive portion disposed adjacent one side of the first plate, the resistance of the resistive portion being such that when a given voltage is applied across the resistive portion, a voltage gradient exists, and a plurality of substantially low impedance, conductive portions of uniform width electrically connected to and transversely extending from different locations of the resistive portion, the low impedance portions being separated by substantially uniform intervals, the second electrode of the first and second cells having substantially low impedance portions and extending adjacent to the surface of the second plate substantially coextensive with and opposite to the low impedance portions of the first electrode, and terminal means for applying voltages to the first and second electrodes, the conductivity of the low impedance portions of the first and second electrodes having a low impedance with respect to said high impedance portion, the first liquid crystal cell having the low impedance portions of its first electrode extending in one direction and the second liquid crystal cell having the low impedance portions of its first electrode extending in a direction different than the one direction of the low impedance portions of the first electrode of the first liquid crystal cell; and first and second light plane polarizer means for respectively transmitting plane polarized light in one plane and blocking plane polarized light in another plane intersecting the plane of the one plane, the liquid crystal cells being disposed between the polarizer means.

2. Display apparatus according to claim 1, wherein the first and second polarizer means are disposed in a crossed relationship to one another to transmit plane polarized light in different planes respectively intersecting the plane of one another, the first liquid crystal cell being disposed to rotate in the regions thereof in which no field is present, the plane of polarization of plane polarized light from the first polarizer means, and the second liquid crystal cell being disposed to rotate in the regions thereof in which no field is present, the plane of polarization of the plane polarized light from the first liquid crystal cell which is rotated by the first liquid crystal cell, whereby a display of a movable white dot on a gray background is obtained.

3. Display apparatus according to claim 1, wherein the first and second polarizer means are disposed parallel relative to one another to transmit plane polarized light in parallel planes, the first liquid crystal cell being disposed to rotate in the regions thereof in which no field is present, the plane of polarization of plane polarized light from the first polarizer means, the second liquid crystal cell being disposed to rotate in the regions thereof in which no field is present, the plane of polarization of the plane polarized light from the first liquid crystal cell which is rotated by the first liquid crystal cell, whereby a display of a generally black dot is obtained on a gray background.

4. Display apparatus according to claim 1 and comprising third light plane polarizer means for transmitting plane polarized light in one plane and blocking plane polarized light in a plane disposed at a predetermined angle with the one plane, the first liquid crystal cell being disposed between the first and second polarizer means and the second liquid crystal cell being disposed between the second and third polarizer means.

5. Display apparatus according to claim 4, wherein the second polarizer means is disposed in a crossed relationship with respect to the first and third polarizer means to transmit plane polarized light in substantially orthogonal planes, the first liquid crystal cell being disposed to rotate in the regions thereof in which no field is present, the plane of polarization of plane polarized light from the first polarizer means, the second liquid crystal cell being disposed to rotate in the regions thereof in which no field is present, the plane of polarization of the plane polarized light from the second polarizer means, whereby a display of generally intersecting white lines is obtained on a gray background.

6. Display apparatus according to claim 4, wherein the first, second and third polarizer means are disposed substantially parallel relative to one another to transmit plane polarized light in substantially parallel planes, the first liquid crystal cell being disposed to rotate in the regions thereof in which no field is present, the plane of polarization of plane polarized light from the first polarizer means, the second liquid crystal cell being disposed to rotate in the regions thereof in which no field is present, the plane of polarization of the plane polarized light from the second polarizer means, whereby a display of generally intersecting black lines is obtained on a gray background.

7. Display apparatus according to claim 1, wherein the width of the electrode low impedance portions is equal to the width of the intervals.

* * * * *

UNITED STATES PATENT AND TRADEMARK OFFICE
CERTIFICATE OF CORRECTION

Page 1 of 2

PATENT NO. : 4,641,923
DATED : February 10, 1987
INVENTOR(S) : William Bohmer et al It is certified that error appears in the above-indentified patent and that said Letters Patent is hereby corrected as shown below:

Title page, Abstract, line 5, delete "electroluminscent" and insert --electroluminescent--; line 9, delete "and a" and insert --ac and--.

Column 2, line 7, delete "Nemati" and insert --Nematic--; lines 41, delete "both a a" and insert --electrodes by which a--.

Column 4, line 25, delete "contrast other" and insert --contrast with other--; line 35, delete "contrast other" and insert --contrast with other--; line 55, delete "after dc" and insert --after a dc--.

Column 9, line 44, delete "variable in a range" and insert --variable range--.

Column 10, line 61, delete "orientes" and insert --orients--.

Column 12, line 48, delete "induoed" and insert --induced--.

Column 14, line 24, delete "potential as a" and insert --potential and as a--.

Column 16, line 55, delete "verticle and insert --vertical--; line 50, delete "vertica" and insert --vertical--.

UNITED STATES PATENT AND TRADEMARK OFFICE
CERTIFICATE OF CORRECTION

PATENT NO. : 4,641,923

DATED : February 10, 1987

INVENTOR(S) : William Bohmer et al

It is certified that error appears in the above-indentified patent and that said Letters Patent is hereby corrected as shown below:

Column 17, line 38, delete "now" and insert --not--.

Signed and Sealed this

Seventeenth Day of August, 1993

Attest:

BRUCE LEHMAN

Attesting Officer

Commissioner of Patents and Trademarks